United States Patent [19]

Kameya et al.

[11] Patent Number: 5,648,126

[45] Date of Patent: Jul. 15, 1997

[54] PROCESS FOR MANUFACTURING A SURFACE-TREATED METAL SHEET OF HIGH DURABILITY

[75] Inventors: Toru Kameya; Hisanori Shimizu, both of Chiba; Katsuaki Takano, Ichikawa; Mitsuru Shimamura, Funabashi, all of Japan

[73] Assignee: Taiyo Steel Co., Ltd., Tokyo, Japan

[21] Appl. No.: 348,953

[22] Filed: Nov. 25, 1994

Related U.S. Application Data

[62] Division of Ser. No. 46,715, Apr. 16, 1993, abandoned.

[30] Foreign Application Priority Data

Jun. 12, 1992 [JP] Japan ................................. 4-177656

[51] Int. Cl.$^6$ .......................... B32B 15/08; B05D 1/28; B05D 1/36; B05D 7/16
[52] U.S. Cl. .................... 427/536; 427/409; 427/419.5; 427/224; 427/388.1
[58] Field of Search .................... 428/215, 416, 428/418, 480, 424.8, 520, 421, 422, 328; 427/295, 388.1, 409, 428, 224, 535, 327, 419.5, 536, 539, 491; 148/264

[56] References Cited

U.S. PATENT DOCUMENTS

| | | | |
|---|---|---|---|
| 2,636,257 | 4/1953 | Ford | 29/195 |
| 4,345,004 | 8/1982 | Miyata et al. | 428/418 |
| 4,358,493 | 11/1982 | Ohtsuki et al. | 428/461 |
| 4,407,689 | 10/1983 | Ohtsuki et al. | 428/461 |
| 4,606,953 | 8/1986 | Suzuki et al. | 428/461 |
| 4,632,959 | 12/1986 | Nagano | 525/70 |
| 4,871,591 | 10/1989 | Sugimura et al. | 427/388.5 |
| 4,888,244 | 12/1989 | Masubucai et al. | 428/416 |

FOREIGN PATENT DOCUMENTS

| | | |
|---|---|---|
| 63-165134 | 7/1988 | Japan. |
| 1020740 | 2/1966 | United Kingdom. |
| 2168621 | 6/1986 | United Kingdom. |

OTHER PUBLICATIONS

Abstract, Derwent (7243006), Chisso Corp. Adhesive-Coated Crystalline Polypropylene Sheet, Jul. 21, 1987.

*Primary Examiner*—John Zimmerman
*Attorney, Agent, or Firm*—Wenderoth, Lind & Ponack

[57] ABSTRACT

A surface-treated metal sheet of high durability having excellent corrosion resistance, weatherability and formability, and intended mainly for use as a material for outdoor construction. It has a chemically conversion treated surface, and carries thereon an undercoat layer of an organic resin paint containing a rust-inhibitive pigment, an intermediate coating layer consisting of an adhesive layer of a modified polyolefin resin and an intermediate layer of a polyolefin resin, and formed by the simultaneous T-die extrusion of those resins, and a topcoat layer of an acrylic, urethane or polyester resin paint, or a fluororesin paint. A process for manufacturing it is also disclosed.

5 Claims, No Drawings

PROCESS FOR MANUFACTURING A SURFACE-TREATED METAL SHEET OF HIGH DURABILITY

This application is a divisional of now abandoned application Ser. No. 08/046,715, filed Apr. 16, 1993.

BACKGROUND OF THE INVENTION

1. Field of the Invention

This invention relates to a surface-treated metal sheet of high durability which comprises a metal sheet coated with a thermoplastic polyolefin resin and a paint for a colored metal sheet prior to its forming into a particular shape, or its use, is used mainly as a material for the construction of an outdoor structure, and has high levels of corrosion resistance, weatherability and formability, and a process for manufacturing the same.

2. Description of the Prior Art

It has hitherto been usual to manufacture a surface-treated and coated metal sheet as a material for an outdoor structure; or article by employing the continuous application of a paint, the continuous lamination of a film, or the continuous hot-melt coating on a metal sheet, such as a hot dipping galvanized steel sheet conforming to JIS G-3302, a zinc electroplated steel sheet conforming to JIS G-3313, a steel sheet galvanized with a 5% Al—Zn alloy which conforms to JIS G-3317, a steel sheet plated with a 55% Al—Zn alloy, a steel sheet plated with aluminum, an aluminum sheet, or a stainless steel sheet, as described below:

(1) Continuous Application of a Paint:

A metal sheet which has been given surface treatment is continuously coated with a paint by, for example, a roll coater to make a two-coat and two-bake colored metal sheet;

(2) Continuous Lamination of a Film:

A metal sheet which has been given chemical surface treatment is undercoated with, for example, an adhesive, and after it has been dried, a resin film is continuously laminated thereon to make a laminated metal sheet; and (3) Continuous Hot-Melt Coating:

The chemically treated surface of a metal sheet is undercoated with an epoxy resin paint, and is continuously coated with a polyolefin resin and a modified polyolefin resin extruded from an extruder through a T-die to make a resin-coated metal sheet.

The surface-treated and coated metal sheet manufactured as hereinabove described has corrosion resistance, weatherability, formability, decorative property, etc., and is stable in quality. Moreover, it does not call for any further coating after its forming into a particular shape, or its use at the site of construction. Therefore, it has been used widely as a material for the construction of an outdoor structure, etc.

While any such surface-treated and coated metal sheet is required to have certain properties including weatherability, corrosion resistance, formability and scratch resistance, very high levels of such properties have recently come to be required of the sheet, so that it may withstand exposure to a severe environment, including a change of environment caused by acid rain, particularly insofar as it is used to construct a structure which is required to be maintenance-free.

As far as weatherability is concerned, it has been found that a fluororesin paint is suitable for maintenance-free application. A steel sheet coated with a thick film of vinyl chloride and a steel sheet coated with a polyethylene resin have, for example, been used as materials having a high level of corrosion resistance.

It has, however, been found that a steel sheet coated with a fluororesin paint and having excellent weatherability as stated above is easily scratched during its forming, such as bending or roll forming, or during its handling for use at the site of construction, since a film of the paint with which it is coated has a thickness which is usually as small as from 25 to 35 microns, and a low degree of hardness, and that the sheet is likely to have a lower degree of corrosion resistance in its scratched, or formed portion. Therefore, it has usually been necessary to employ a protective film, or repair any scratched portion after the work of forming. Studies have been made to solve those problems and form a coating film of a fluororesin paint having a high degree of hardness and thereby achieving an improved scratch and wear resistance without the sacrifice of the formability of the coated metal sheet, or the adhesion of the film, while retaining the advantage of the fluororesin paint. As a result, it has been proposed that glass fibers be added to a fluororesin paint with which a metal sheet is coated, as taught in Japanese Patent Publication No. Sho 60-7946 entitled "Process for Manufacturing a Coated Metal Sheet of High Durability", or Japanese Patent Application laid open under No. Sho 61-237636 entitled "Coated Steel Sheet".

According to the disclosure of those publications, it is preferable for forming a good coating film that the glass to be added to the paint in the form of surface-treated fibers.

We, the applicant of this application, have, however, found that even a film having a high degree of hardness as suggested above is not sufficient for protecting the coated metal sheet from being scratched during its forming into a particular shape, or during its handling for use at the site of construction. We have found the rapid progress of local corrosion, or the so-called flowering, on a steel sheet coated with a fluororesin paint as a result of its exposure to an actually prevailing environment. The addition of surface-treated glass beads is preferred to prevent such rapid and local flouring.

Despite these improvements, however, it has still been the drawback of the fluororesin-coated steel sheet having a high level of weatherability that the steel surface under the coating film is scratched during its forming, or its handling for use, since the film has a thickness which is as small as from 25 to 35 microns.

A steel sheet coated with vinyl chloride, or a polyolefin resin has a high degree of corrosion resistance, since a film with which it is coated has a thickness of 150 to 300 microns which is so large that, even if any scratch may be made during the forming of the sheet into a particular shape, or during its handling for use, it terminates within the film and does not reach the steel surface, and since it is so high in formability that no cracking occur to any formed portion thereof. The energy which binds the atoms forming the molecules of any of those resins is, however, lower than the equivalent energy in the fluororesin, and lower than the energy of sunlight. Therefore, those resins undergo rapid deterioration upon exposure to an actual outdoor environment, even if measures, including the control of their molecular weights, or molecular weight distribution, and the addition of a heat or light stabilizer, may be taken to improve their weatherability.

SUMMARY OF THE INVENTION

In view of the problems as stated above, it is an object of this invention to provide a surface-treated metal sheet of high durability having both weatherability and corrosion resistance which cannot be obtained by the mere use of a single manufacturing process selected from the continuous application of a paint, continuous lamination of a film, and hot-melt coating, and a process for manufacturing the same.

The surface-treated metal sheet of this invention has on the surface of a metal sheet an undercoat layer of an organic resin paint containing a rust-inhibitive pigment consisting mainly of a chromium compound, an intermediate coating layer formed on the undercoat layer and consisting of an adhesive layer of a modified polyolefin resin and an intermediate layer of a polyolefin resin, and a topcoat layer formed on the intermediate coating layer from an acrylic resin paint, a urethane resin paint, a polyester resin paint or a fluororesin paint.

The process of this invention comprises forming an undercoat layer on the surface of a metal sheet by applying thereto an organic resin paint containing a rust-inhibitive pigment consisting mainly of a chromium compound and drying it, coating on the undercoat layer with a modified polyolefin resin and a polyolefin resin melted under heat and extruded simultaneously in two layers through a T-die on an extruder to form an intermediate coating layer consisting of an adhesive layer formed by the modified polyolefin resin and an intermediate layer formed by the polyolefin resin, and forming a topcoat layer on the intermediate coating layer by applying thereto an acrylic resin paint, urethane resin paint, polyester resin paint, or fluororesin paint and drying it, whereby a surface-treated metal sheet of high durability is obtained.

The metal sheet used as a base, or starting material may, for example, be a galvanized steel sheet, a steel sheet plated with an aluminum-zinc alloy, a steel sheet plated with aluminum, an aluminum sheet, or a stainless steel sheet. It is usually desirable to give chemical conversion treatment to the sheet surface to improve the adhesion of the undercoat layer to it. This chemical conversion teatment is usually done by spraying a phosphoric acid type treating agent onto the sheet, or immersing it in such an agent, or coating it with a chromic acid type treating agent.

An undercoat paint is applied onto the chemically treated surface of the sheet by, for example, a roll coater, and dried. The undercoat paint may be an epoxy, polyester, or other organic resin paint containing a rust-inhibitive pigment consisting mainly of a chromium compound, such as strontium or zinc chromate. The epoxy resin paint is, among others, preferred from the standpoint of corrosion resistance and also because of its good adhesion to the adhesive layer of a modified polyolefin resin. The undercoat layer has a dry thickness of 1 to 20 microns. Its drying is carried out by heating the sheet to a temperature of 180° C. to 240° C.

A modified polyolefin resin and a polyolefin resin which have been melted under heat are extruded from an extruder through a T-die, and pressed against the surface of the undercoat layer to form an intermediate coating layer in the form of a two-layer composite film consisting of an adhesive layer of the modified polyolefin resin and an intermediate layer of the polyolefin resin. The adhesive layer is employed to improve the adhesion between the undercoat and intermediate layers. The T-die extrusion of the two layers can be carried out by, for example, the method disclosed in our Japanese Patent Application laid open under No. Sho 57-203545.

Although it is usual to add heat and light stabilizers, etc. to a polyolefin resin to prevent its oxidation at a high temperature and its decomposition by ultraviolet light, this invention does not essentially call for the addition of any such heat or light stabilizer, since the topcoat which will hereinafter be described protects the polyolefin resin from direct exposure to oxygen, ultraviolet light, etc. It is, however, preferable to add heat and light stabilizers in view of the possibility that the topcoat may be destroyed by scratching, etc. when a final product is used. A phenol, phosphorus, hindered phenol, or thioether compound is usually employed as the heat stabilizer, and a benzotriazole, benzophenone, acrylate, oxanilide, nickel complex, or hindered amine compound as the light stabilizer.

The intermediate coating layer preferably has a thickness of 50 to 500 microns. The adhesive layer may have a thickness of 5 to 30 microns, and the polyolefin resin layer on the adhesive layer may have a thickness of 45 to 495 microns. A polypropylene or polyethylene resin may be used as the polyolefin resin. The use of a polyethylene resin is, among others, recommended because of its high extrudability, the high formability of the resulting surface-treated metal sheet, etc.

When a heat stabilizer (e.g. Irganox 1010) is used, it is likely that, after the topcoat is dried at a high temperature, the decomposition and evaporation of the volatile matter which the heat stabilizer contains may result in the formation of bubbles or blisters in the intermediate coating layer and thereby yield a surface-treated metal sheet having an unacceptably poor surface appearance. It is, therefore, desirable to use a refined heat or light stabilizer having a low volatile content. It is alternatively possible to prevent the formation of such bubbles or blisters if, prior to the application of the topcoat, any impurities in the heat stabilizer are caused to undergo decomposition and evaporation by heating the intermediate coating layer so that the metal sheet temperature may reach a maximum of 240° C. to 280° C. The heat stabilizer is preferably employed in the amount of, say, 0.10 to 0.15% by weight of the polyolefin resin, so that no bubble or blister may be formed.

Then, the topcoat is applied onto the intermediate coating layer. In the event, however, that it is likely, depending on the polyolefin involved, that no satisfactorily good interlayer adhesion may be obtained, the intermediate coating layer is modified by flame or corona discharge treatment, so that a large number of functional groups capable of conbining with hydrogen, such as hydroxyl, carbonyl or carboxyl groups, may be formed on the surface of the polyolefin resin layer, and raise its polarity to thereby improve its adhesion to the topcoat paint.

The amount of heat in the range of, say, 3 to 50 kcal/m$^2$/min. is preferably employed for the appropriate flame treatment of the intermediate coating layer. If it is smaller than 3 kcal/m$^2$/min., no satisfactorily improved adhesion can be obtained, and the use of heat in any amount over 50 kcal/m$^2$/min. is undesirable, since the heat of combustion by a flame burner causes the yellowing and deterioration of the resin, and also since it adds to the cost Of the treatment. The burner and the intermediate coating layer to be treated are preferably positioned at a distance of, say, 10 to 100 mm from each other, and usually at a distance of, for example, about 30 mm.

The corona discharge treatment can be carried out in a similar way to produce similar results.

A topcoat layer having excellent weatherability is formed on the intermediate coating layer which has been treated as hereinabove described. It is preferable from the standpoints of weatherability, scratch resistance, etc. to form the topcoat layer of an acrylic, urethane or polyester resin paint, or a fluororesin paint. The top-coat layer is usually formed by the continuous application of the paint by a roll coater so as to have a dry thickness of 5 to 35 microns. Its drying is carried out by heating so that the sheet temperature may reach a range of 200° C. to 250° C.

Thus, there is obtained a surface-treated metal sheet of high durability according to this invention which is superior in weatherability, corrosion resistance, formability, etc. compared to any standmetal o-coat and two-bake coated metal sheet made by the continuous application of a paint, any laminated steel sheet made by the continuous lamination of a film, and any resin-coated metal sheet made by the continuous heat-melt extrusion of a resin, while possessing the advantages of those three processes.

The invention will now be described with reference to examples thereof and comparative examples.

EXAMPLES

Description will be made of the specific features and advantages of this invention by referring to three typical examples of this invention and the corresponding comparative examples. In Examples 1, 2 and 3 of this invention, flame, or corona discharge treatment was employed before the application of a topcoat to improve its adhesion.

The conditions employed for surface treatment are shown in TABLE 1, and the results of tests conducted in TABLE 2.

TABLE 1

| | Metal Sheet (1) | | Chemical conversion Treatment | Under coat (2) | | | | |
|---|---|---|---|---|---|---|---|---|
| | Type | Thickness (mm) | Type | Type | Thickness | Applied by | Heating temp. | Heating time |
| Example 1 | Zinc-plated steel sheet | 0.35 | Chromate coating | Urethane-modified epoxy resin paint containing a strontium chromate pigment | 5μ | Roll coating | 200° C. | 50 sec |
| 2 | Steel sheet plated with a 5% Al—Zn alloy | 0.50 | Chromate coating | Urethane-modified epoxy resin paint containing a strontium chromate pigment | 7μ | Roll coating | 200° C. | 60 sec |
| 3 | Galvanized steel sheet | 0.35 | Chromate coating | Urethane-modified epoxy resin paint containing a strontium chromate pigment | 5μ | Roll coating | 190° C. | 45 sec |
| Comparative Example 1 | Zinc-plated steel sheet | 0.50 | Chromate coating | Urethane-modified epoxy resin paint containing a strontium chromate pigment | 5μ | Roll coating | 190° C. | 45 sec |
| 2 | Steel sheet plated with a 5% Al—Zn alloy | 0.35 | Chromate coating | Epoxy resin paint containing a strontium chromate pigment | 5μ | Roll coating | 210° C. | 50 sec |
| 3 | Zinc-plated steel sheet | 0.80 | Chromate coating | Urethane-modified epoxy resin paint containing a strontium chromate pigment | 7μ | Roll coating | 200° C. | 60 sec |
| 4 | Golvanized steel sheet | 0.35 | Chromate coating | Urethane-modified epoxy resin paint containing a strontium chromate pigment | 5μ | Roll coating | 190° C. | 25 sec |

| | Intermediate coating layer (3) | | | | Top coat (4) | | | | |
|---|---|---|---|---|---|---|---|---|---|
| | Type | Adhesive layer thickness | Intermediate layer thickness | Applied by | Type | Thickness | Applied by | Heating temp. | Heating time |
| Example 1 | A composite film of modified polyethylene and polypropylene | 10μ | 150μ | T-die | Acryl-modified vinylidene fluoride resin paint | 20μ | Roll coating | 240° C. | 60 sec |
| 2 | A composite film of modified polyethylene and polyethylene | 15μ | 200μ | T-die | Acryl-modified vinylidene fluoride resin paint | 20μ | Roll coating | 240° C. | 70 sec |
| 3 | A composite film of modified polyethylene and polyethylene | 10μ | 200μ | T-die | Polyester resin paint | 20μ | Roll coating | 220° C. | 50 sec |
| Comparative Example 1 | — | — | — | — | Acryl-modified vinylidene fluoride resin paint | 20μ | Roll coating | 240° C. | 50 sec |
| 2 | — | — | — | — | Vinyl chloride film | 200μ | Film lamination | — | — |
| 3 | — | — | — | — | A composite film of modified polyethylene and polyethylene | 150μ | T-die | — | — |
| 4 | — | — | — | — | Polyester resin paint | 15μ | Roll coating | 220° C. | 30 sec |

TABLE 2

| Test Items and conditions | Example 1 | Example 2 | Example 3 | Comparative Example 1 | Comparative Example 2 | Comparative Example 3 | Comparative Example 4 |
|---|---|---|---|---|---|---|---|
| Formability |  |  |  |  |  |  |  |
| Vise bending test |  |  |  |  |  |  |  |
| 0T | 5/5 | 5/5 | 4/4 | 4/4 | 5/5 | 5/5 | 4/4 |
| 2T | 5/5 | 5/5 | 4/4 | 5/5 | 5/5 | 5/5 | 4/4 |
| Scratch resistance |  |  |  |  |  |  |  |
| Pencil hardness test | 5B | 5B | 5B | F | 6B | 6B | H |
| Adhesion |  |  |  |  |  |  |  |
| Cross-cut test | 100/100 | 100/100 | 100/100 | 100/100 | 100/100 | 100/100 | 100/100 |
| Tape peeling |  |  |  |  |  |  |  |
| Cross-cut test after 2 hrs of immersion in boiled water | 100/100 | 100/100 | 100/100 | 100/100 | 100/100 | 100/100 | 100/100 |
| Tape peeling |  |  |  |  |  |  |  |

| Test items and conditions | Example 1 | Example 2 | Example 3 | Comparative Example 1 | Comparative Example 2 | Comparative Example 3 | Comparative Example 4 |
|---|---|---|---|---|---|---|---|
| Corrosion resistance |  |  |  |  |  |  |  |
| Salt spray test 3000 hrs |  |  |  |  |  |  |  |
| Flat portion | ○ | ○ | ○ | ○ | ○ | ○ | Δ |
| Cross-cut portion (mm) | 1 | 1 | 1 | 2 | 1 | 1 | 10 |
| 2T formed portion | ○ | ○ | ○ | X | ○ | ○ | X |
| Humidity exposure test 3000 hrs |  |  |  |  |  |  |  |
| Flat portion | ○ | ○ | ○ | ○ | ○ | ○ | Δ |
| Cross-cut portion (mm) | 0 | 0 | 0 | 1 | 3–5 | 0 | 4 |
| 2T formed portion | ○ | ○ | ○ | Δ | ○ | ○ | X |
| Weatherability |  |  |  |  |  |  |  |
| DSW test 2000 hrs | ○ | ○ | Δ | ○ | X | X | Δ |

The following is a description of the tests and conditions employed for the tests, and the standards for the evaluation of the test results:

(1) The formability tests 0T and 2T by a vise were each conducted by bending each sample by an angle of 180 degrees with the vise, and the results were rated by scores, as explained below. Score 5 means that no cracking was found, score 4 means that there was no peeling of the coating film despite its cracking, score 3 means that less than 30% of the film peeled off, score 2 means that from 30%, inclusive, to 70%, exclusive, of the film peeled off, and score 1 means that 70% or more of the film peeled off. The lower scores indicate the results of evaluation made after forced peeling with a plastic tape.

(2) The scratch resistance was determined by conducting a pencil hardness test in accordance with JIS D-0202.

(3) The adhesion was determined by conducting a cross-cut test in accordance with JIS K-5400.

(4) The corrosion resistance was determined by conducting a salt spray test and a humidity exposure test for 3000 hours. The results of the tests on the flat portion of each sample are shown by ○ when it did not swell at all, by Δ when it swelled to some extent, and by x when it swelled heavily. The results of the tests on the cross-cut portion are shown by the width of its swollen area in mm. The results of the tests on the 2T formed portion are shown by o if it was not rusty at all, by Δ if it was somewhat rusty, and by x if it was very rusty.

(5) The weatherability was determined by conducting 2000 hours of a test by a weatherometer in accordance with JIS K-5400. The results of the tests are shown by o if no change was found in color or luster, by Δ if some changes were found in color and luster, and by x if great changes were found.

As is obvious from the foregoing, this invention provides a coated metal sheet of high durability having, among others, excellent corrosion resistance, weatherability and formability which cannot be attained by any conventional surface-treated steel sheet, by employing a polyolefin resin and a paint for a colored steel sheet in combination, so that the paint for a colored steel sheet may compensate for the drawbacks of the polyolefin resin, and vice versa. Thus, it has a very high level of industrial utility.

What is claimed is:

1. A process for manufacturing a surface treated metal sheet of high durability, the process consisting of the steps of:

a. subjecting a metal sheet to a chemical treatment to form a chemically treated metal sheet;

b. applying by roll coating an organic resin paint containing a rust-inhibitive pigment onto the chemically treated metal sheet and drying the organic resin paint to form an undercoat layer on the chemically treated metal sheet;

c. extruding a molten modified polyolefin resin and a molten polyolefin resin simultaneously in two layers from an extruder through a T-die to form an intermediate coating layer having a thickness of 50 to 500 microns on the undercoat layer, the intermediate coating layer consisting of an adhesive layer of 5 to 30 microns of the modified polyolefin resin on the undercoat layer and a layer of the polyolefin resin of 45 to 495 microns on the adhesive layer; and d. applying, as a topcoat paint, an acryl-modified vinylidene fluoride resin paint onto the intermediate coating layer and drying the topcoat paint to form a topcoat layer on the intermediate coating layer and optionally subjecting said intermediate layer to flame or corona discharge treatment before forming said topcoat layer thereon.

2. The process as set forth in claim 1, wherein said chemical treatment is chromating.

3. The process as set forth in claim 1, wherein said drying for said undercoat layer is carried out by heating said sheet to a temperature of 180° C. to 240° C., and said undercoat layer has a dry thickness of 1 to 20 microns.

4. The process as set forth in claim 3, wherein said drying for said topcoat layer is carried out by heating said sheet to a temperature of 200° C. to 250° C., and said topcoat layer has a dry thickness of 5 to 35 microns.

5. The process as set forth in claim 4, further including subjecting said intermediate layer to flame or corona discharge treatment before forming said topcoat layer thereon.

* * * * *